Patented Jan. 16, 1934

1,943,525

UNITED STATES PATENT OFFICE 1,943,525

COLORED ROOFING GRANULE

Henry R. Gundlach, Baltimore, Md., assignor to Central Commercial Company, a corporation of Illinois No Drawing. Application August 19, 1931
Serial No. 558,105

10 Claims. (Cl. 91—70)

This invention relates to the art of attaching color pigments to building material and other objects, and more particularly to the coloring of granules for use in roofing material and the like. In the preparation of artificial roofing from felt it is the common practice to impregnate the felt with an asphaltic compound or the like and then after covering the felt with a layer of asphalt to press or roll into the surface thus prepared a layer of granules. In order to vary the color of the exposed surface of the roofing material granules of different colors are employed for this outer layer.

But considerable difficulty has been experienced in treating these granules so that the color pigments will be permanently attached to the granules with the brilliancy of the colors unimpaired.

It is common practice to attach the color pigment to the granules with a binder, but the binder is usually water glass, which is soluble if used alone, and consequently is gradually dissolved by the elements and the pigments washed away, or if the colored pigments be heat-treated or treated with a fixing agent there is more or less chemical reaction between the pigment and the binder or fixing agent, which is likely to affect the brilliancy of the colors of the pigments.

The present invention seeks to remedy these difficulties by the use of an insoluble cement that does not impair the properties of either the granule or the color pigment but that binds the pigment to the granule without impairing the brilliancy of its color.

The cementing material employed is insoluble in water and preferably comprises phosphoric acid (ortho-phosphoric acid $H_3PO_4$) and an oxide of the family B, group II of the periodic classification of the elements, as zinc oxide (ZnO) or magnesium oxide (MgO). A filler may also be added, as some insoluble silicate or siliceous material in a finely divided state, such for instance as china clay, ground glass, silica and the like. The cement tends to set rapidly and in order to retard the setting of the same so that the granules may be uniformly covered with the pigment and cement before the cement hardens, a suitable retarder is preferably used, such as aluminum phosphate or zinc phosphate. The time required for the setting of the cement is inversely proportional to the strength of the phosphoric acid, and unless a retarder be employed there is scarcely time for the proper distribution of the cement through the mass. In practice, aluminum hydroxide is employed because it reacts on the phosphoric acid to form aluminum phosphate.

For simplicity of disclosure, the invention will be described with reference to the coloring of granules, but it is understood that the selection of this particular material is by way of example only.

The granules may be cleaned if necessary, after which they are treated in any suitable manner with cementing materials, a filler and a retarder composition for preventing the too hasty setting of the cement.

In practicing the invention, the following amounts and method of applying the color pigment to the granules give satisfactory results:

To each ton of granules add the following, that have previously been ground together or otherwise treated to secure an intimate mixture, finely ground:

10 lbs. zinc oxide (ZnO)
10 lbs. china clay, ground glass silica or other filler material
12 lbs. color pigment and the whole mass thoroughly stirred or agitated to uniformly distribute the materials throughout the mass of granules.

115 to 120 lbs. of 19% to 20% phosphoric acid (orthophosphoric acid $H_3PO_4$) to which has been added 2¾ to 3 lbs. of aluminum hydroxide, $Al(OH)_3$, is then added to the dry mass and the whole thoroughly and intimately mixed in a mixing machine or the like to secure uniform distribution of the color on the granules and to prevent agglomeration. The mass is then passed through one or more drying ovens.

The mass may be passed first through an oven where the granules are heated 140° to 160° F., then passed through another oven for heating them from 280° to 320° F. to remove excess moisture, or the mass may be moved through a long oven heated around 160° F. at one end and around 280° to 320° F. at the other end for heating the granules to those temperatures for removing excess moisture.

The amount of color pigment will vary, depending on the pigment used and the color or intensity of color desired. The above gives satisfactory results for the use of iron oxide for coloring the granules red, or chromic oxide for coloring them green.

While the above formula gives satisfactory results, it is understood that the proportion of the various compounds may be varied or their equivalents used without departing from the spirit of the invention as defined in the appended claims.

I claim as my invention:

1. A method of coloring granules of mineral matter suitable for use on composition roofing which consists in attaching color pigments to the granules with a waterproof cement comprising a mixture of phosphoric acid, a filler and zinc oxide.

2. A method of coloring granules of mineral matter suitable for use on composition roofing and the like which consists in treating the granules with compositions comprising color pigments, phosphoric acid zinc oxide, a retarder and a filler.

3. A method of coloring granules suitable for use on composition roofing which consists in treating the same with compositions comprising color pigments, phosphoric acid, a filler and zinc oxide.

4. A method of coloring the surfaces of objects of mineral matter suitable for use on composition roofing which consists in treating said surfaces with compositions comprising phosphoric acid, zinc oxide, china clay, aluminum phosphate and color pigments.

5. A coating for granules suitable for composition roofing and the like comprising zinc oxide, phosphoric acid, finely ground siliceous material, color pigments and zinc phosphate.

6. A process of coloring granules of mineral matter suitable for use on composition roofing which comprises intimately grinding together zinc oxide, china clay and color pigment, mixing the ground mass with granules, and then treating the whole mass with phosphoric acid to which has been added a small quantity of aluminum hydroxide, and finally drying the mass.

7. A process of coloring granules of mineral matter suitable for use on composition roofing which comprises intimately mixing 10 lbs. zinc oxide, 10 lbs. china clay, 12 lbs. color pigment, and reducing the same to a finely divided state, mixing the same with a ton of granules in dry form, then adding to the mass 115 to 120 lbs. of 19% to 20% phosphoric acid to which has been added 2¾ to 3 lbs. of aluminum hydroxide, and then agitating and drying the mass.

8. Building material comprising a mass of particles of mineral matter for use in composition roofing and the like to which color pigment has been applied to the surface of the individual particles by a cement comprising zinc oxide and phosphoric acid.

9. A method of coloring roofing granules which consists in attaching color pigment in finely divided form to the surface of said objects by a cement insoluble in water comprising an oxide of the family B of group II of the periodic classification of elements and orthophosphoric acid.

10. A method of coloring granules suitable for composition roofing which consists in mixing the following ingredients in the proportions indicated and applying the mixture to said granules:—

1 ton of granules
10 lbs. magnesium oxide
10 lbs. ground glass
12 lbs. color pigment
2¾ to 3 lbs. aluminum hydroxide
115 to 120 lbs. of 19% to 20% orthophosphoric acid.

HENRY R. GUNDLACH.